United States Patent [19]

Osvaldo

[11] Patent Number: 6,089,462
[45] Date of Patent: Jul. 18, 2000

[54] THERMOSTATIC MIXING VALVE

[75] Inventor: Ruga Osvaldo, Gozzano, Italy

[73] Assignee: Officina Meccanica Ruga Osvaldo, Gozzano, Italy

[21] Appl. No.: 09/370,328

[22] Filed: Aug. 6, 1999

Related U.S. Application Data

[63] Continuation of application No. PCT/IT98/00016, Feb. 4, 1998.

[51] Int. Cl.⁷ .................................................. G05D 23/13
[52] U.S. Cl. ............................................................ 236/12.2
[58] Field of Search ............................... 236/12.2, 12.21, 236/12.22

[56] References Cited

U.S. PATENT DOCUMENTS

| | | | |
|---|---|---|---|
| 4,029,256 | 6/1977 | Dauga | 236/12.2 |
| 4,349,149 | 9/1982 | Humpert . | |
| 5,340,018 | 8/1994 | MacDonald | 236/12.2 |
| 5,370,305 | 12/1994 | Schneider | 236/12.2 |
| 5,709,339 | 1/1998 | Bergmann | 236/12.2 |

FOREIGN PATENT DOCUMENTS

| | | |
|---|---|---|
| 0 560 737 A2 | 9/1993 | European Pat. Off. . |
| 31 18003 C2 | 12/1984 | Germany . |

*Primary Examiner*—William E. Tapolcai
*Attorney, Agent, or Firm*—Akin, Gump Strauss, Hauer & Feld, L.L.P.

[57] ABSTRACT

The invention relates to a cartridge thermostatic mixing valve, secured by a ring within a standard tap body, divided into a first upper subassembly made up of the members for transmitting the temperature adjustment (1–10) and a second lower subassembly including the members for transmitting the flow rate adjustment and the valve group which carries out said adjustment (11, 12, 17–24). The first subassembly is removable in an assembled state from the cartridge without acting on the second subassembly which is retained in its position by the ring, so as to remove the member of the thermostatic device for the cleaning of the mixing chamber without requiring to cut off the water upstream from the tap. The cartridge has a simplified structure with a small number of pieces, with the temperature and flow rate controls which are completely independent of each other and consist of a temperature adjustment knob and a flow rate adjustment lever which is rotatable between the knob and the tap body.

8 Claims, 5 Drawing Sheets

THERMOSTATIC MIXING VALVE

CROSS-REFERENCE TO RELATED APPLICATION

This application is a continuation of International Application PCT/IT98/00016, filed Feb. 4, 1998, the disclosure of which is incorporated herein by reference.

BACKGROUND OF THE INVENTION

The present invention relates to taps for mixing hot and cold water in sanitary facilities (wash-basins, showers, bathtubs, etc.), and in particular to a cartridge mixing valve provided with a thermostatic device suitable to maintain a constant water temperature.

It is known that conventional single-control mixing taps include a tap body with a cartridge mixing valve (hereinafter simply cartridge) removably inserted therein and a control lever for controlling a valve group, within the cartridge, made up of a pair of ceramic disks which adjust the flow of hot and cold water. This adjustment of the water, both in flow rate and in temperature, is carried out through the translation and rotation, respectively, of a mobile disk over an underlying fixed disk. In this way, the extent of aperture of the ports formed in said disks for the passage of hot and cold water is changed, and so is the ratio between hot water and cold water when they are mixed prior to the conveying to the tap mouth.

In order to maintain a constant temperature of the delivered water, both between two tap openings and during a same opening, it is possible to incorporate a thermostatic device in a conventional tap. Such a device acts downstream from the valve group by controlling the inflow of hot and cold water into the mixing chamber through respective ports. As it will be better explained further on, this control is carried out automatically by a thermosensitive bulb which causes the shifting of a slider suitable to change the aperture of said ports in the mixing chamber.

A first possible solution is to place the thermostatic device at the bottom of a common single-control mixer, i.e. below the valve group. This solution has several drawbacks both of installation, and of use and maintenance. First of all the assembly of the elements to be housed inside the tap body, the lower portion of the cartridge, is higher than in conventional cartridges, thus requiring a tap body which is higher than standard height. Secondly, the use of a single control for temperature and flow rate implies a difficult repeatability of temperature between two openings. Moreover, there is a poor precision in adjusting the temperature due to the limited travel of the single control, which generally has a maximum rotatory travel of 90° around the tap mouth (±45°)

A third kind of drawback occurs when it is necessary to reach the thermostatic device for its maintenance. As a matter of fact, the most frequent need is to clean the mixing chamber from possible encrustations and/or deposits which may jeopardize the correct operation of the device. This need stems from the fact that the slider travel is of a few tenths of millimeter (usually max. 0,6 mm), therefore even small-size impurities may prove detrimental. However, the position of the thermostatic device requires the complete disassembly of the cartridge and therefore of the valve group too. This implies the necessity of cutting off the water, both hot and cold, upstream from the tap by means of a general valve or the like.

Another known solution suitable to overcome some of the above-mentioned drawbacks is to separate the flow rate control from the temperature control and to place the thermostatic device above the valve group. The use of two separate controls allows to achieve a more precise adjustment of temperature through the rotation of a ring along a greater arc (up to 360°), and also without any problem of repeatability between two openings. Furthermore, the lower portion of the cartridge is small enough to be housed in a standard-size tap body. However, also this second solution is not free from drawbacks of installation, use and maintenance similar to the previous ones though to a lower degree.

First of all, the flow rate control is a horizontal rotating lever located above the ring for the temperature adjustment. This still implies a position of the flow rate control higher than in conventional taps, whereby even the use of a standard tap body results in a tap having a greater overall height. Moreover, the above-described arrangement makes it difficult to reach the ring for the temperature adjustment, since the user has to insert his hand between the tap mouth and the lever above.

Secondly, the thermostatic device is located between the flow rate control and the valve group controlled by the latter. As a result, the flow rate adjustment is necessarily transmitted by a connection which passes through the thermostatic device, which is possibly used directly as a transmission means. In any case, the more or less close coupling between the flow rate control and the temperature control leads to a mutual interference which may affect the device operation. In other words, when changing the flow rate it may happen that also the temperature is changed and vice versa. Moreover, the thermostatic device is stressed also by loads not depending on its specific operation.

Finally, the above-mentioned third kind of drawback is still present as far as the cleaning and maintenance of the thermostatic device are concerned. In fact, since the kinematic chain which transmits the flow rate adjustment has to be removed in order to reach the thermostatic device, it is still necessary to disassemble completely the cartridge and thus to cut off the water upstream from the tap.

SUMMARY OF THE INVENTION

Therefore the object of the present invention is to provide an improved cartridge suitable to overcome the above-mentioned drawbacks.

This object is achieved by means of a cartridge having the characteristics disclosed in claim 1.

A first advantage of the present cartridge is that it makes easy to reach the thermostatic device, without requiring neither the complete disassembly of the cartridge nor the cutting off of the water upstream from the tap.

A second advantage of the cartridge according to the present invention is to make the flow rate and temperature controls completely independent, whereby no mutual interference is possible.

A third advantage of this cartridge stems from the arrangement of the coupling of the temperature control at the top, which results in greater ease of adjustment of the temperature and lower overall height of the tap.

Still another advantage of the present invention is a greater ease of adjustment of the flow rate, since the relevant control acts directly on the mobile disk without having to drag other members and therefore with a lower friction.

A further advantage of this cartridge is that it is manufactured with a simplified structure made up of less pieces, which results in lower production and assembly costs.

BRIEF DESCRIPTION OF THE SEVERAL VIEWS OF THE DRAWINGS

These and other advantages and characteristics of the cartridge according to the present invention will be clear to those skilled in the art from the following detailed description of an embodiment thereof, with reference to the annexed drawings wherein.

DETAILED DESCRIPTION OF THE INVENTION

Figure 1:
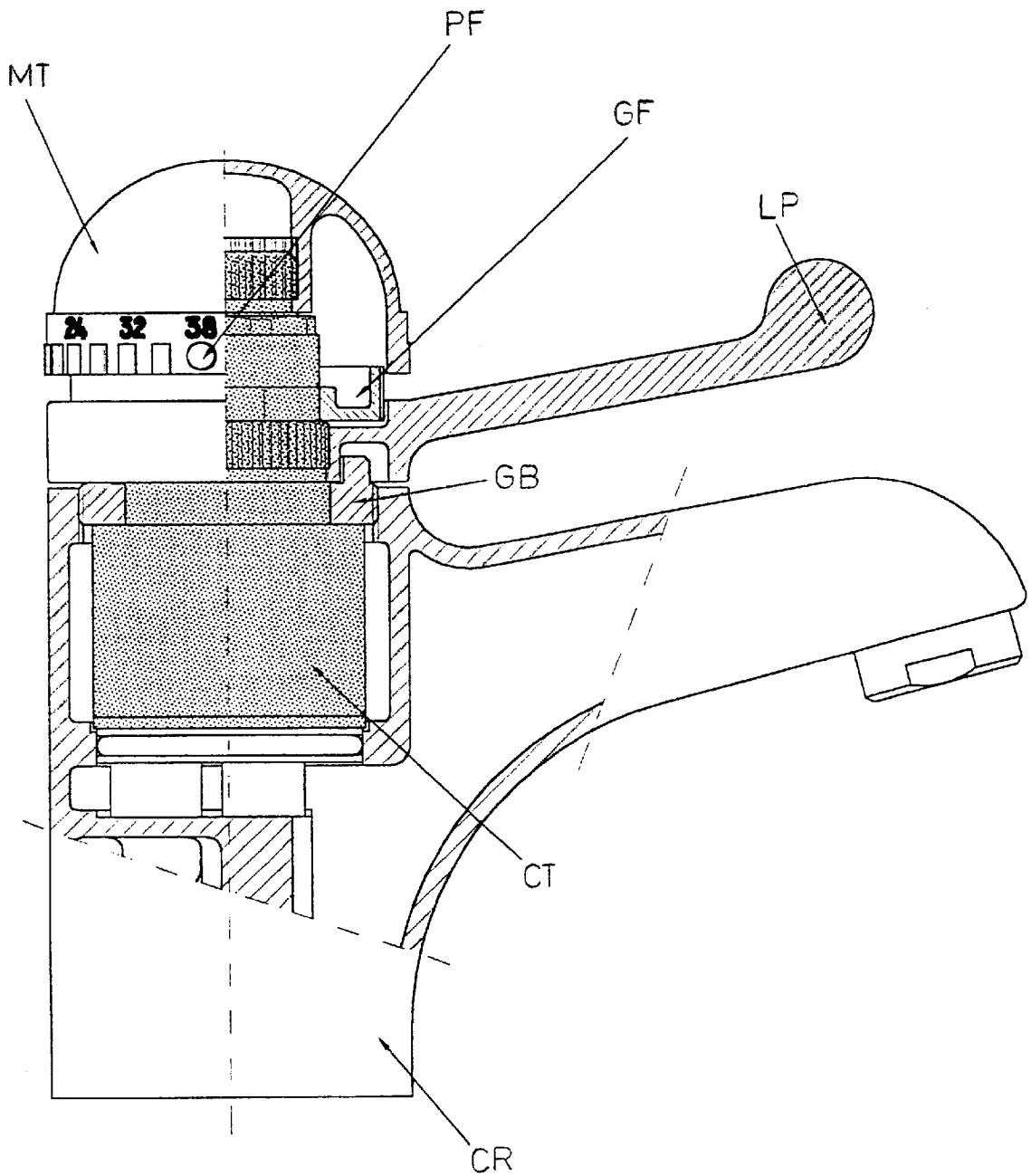
FIG. 1 is a schematic side view showing a tap which includes a cartridge according to the invention.

With reference to FIG. 1, there is seen that a thermostatic cartridge CT according to the present invention is inserted in a conventional tap body CR and secured therein by a locking ring GB, which abuts on the top of the case of the lower portion of cartridge CT. On the upper portion of cartridge CT, which projects out of body CR, there are mounted a knob MT for the temperature adjustment and a lever LP for the flow rate adjustment.

Knob MT consists of a spherical bowl, fixed at the top of cartridge CT, provided along its peripheral edge with reference notches which in combination with a fixed reference ring GF, keyed therebelow, show the temperature setting. At the 38° C. setting there is also provided a stop button PF with an anti-scald function, i.e. such as to prevent the unintentional setting of an excessive temperature. Lever LP for openig/closing the tap is in turn keyed onto cartridge CT, below ring GF and rotatably inserted between the latter and the tap body CR.

Figure 2:
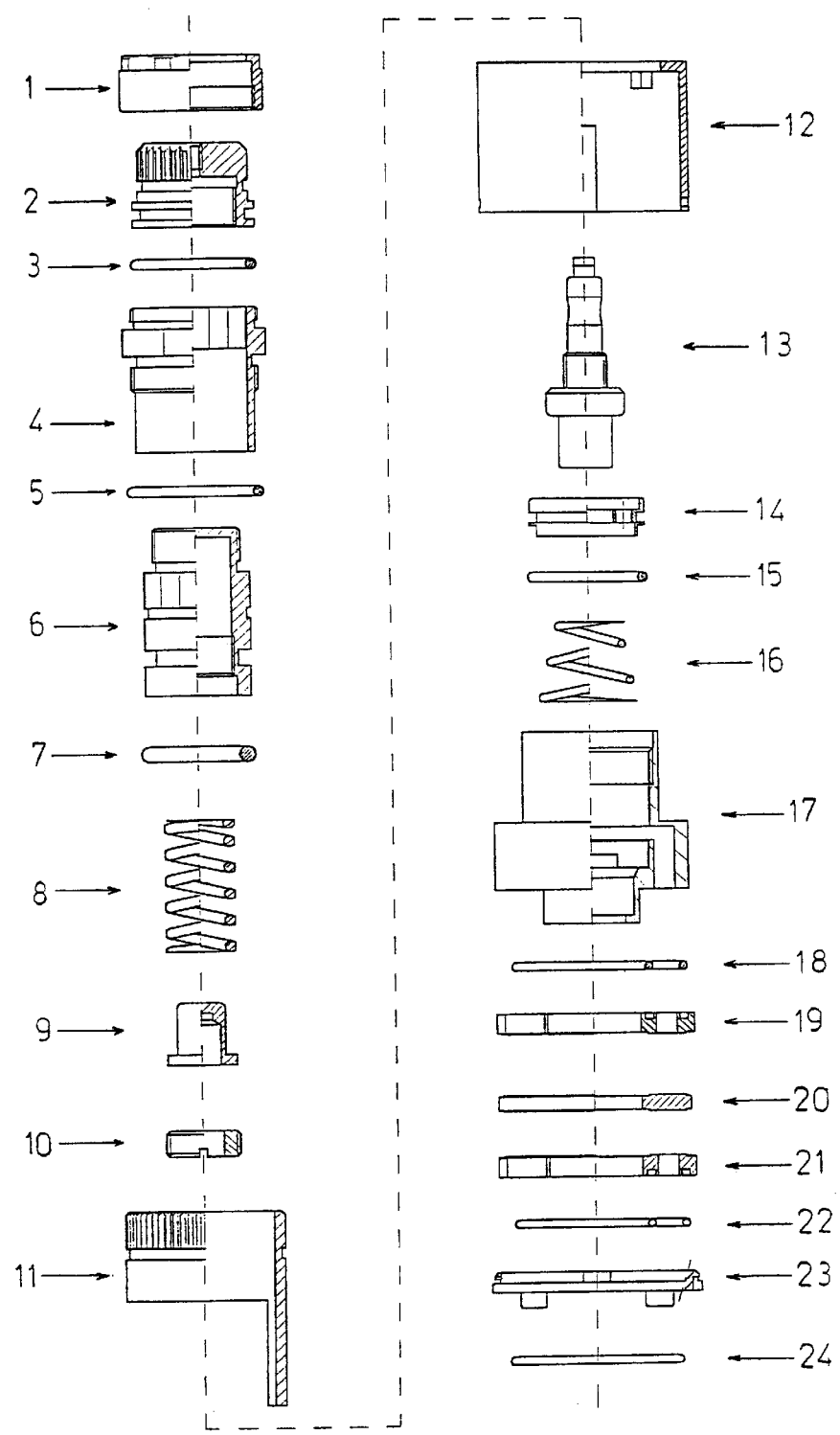
FIG. 2 is an exploded, partially sectional, side view of the members which make up the cartridge of the above-mentioned tap.
Figure 3:
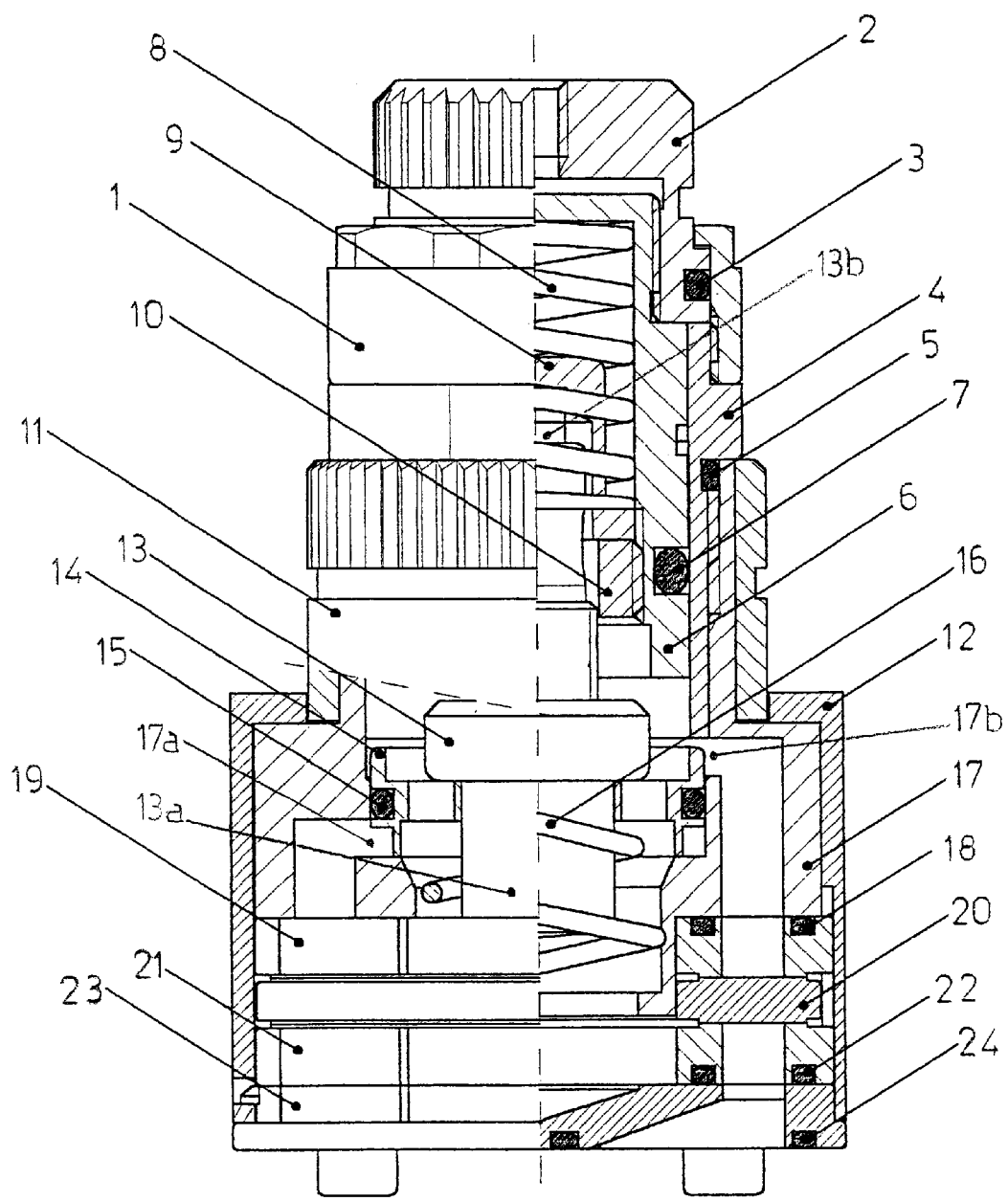
FIG. 3 is a schematic, partially sectional, side view showing the members of FIG. 2 in an assembled state.
Figure 4:
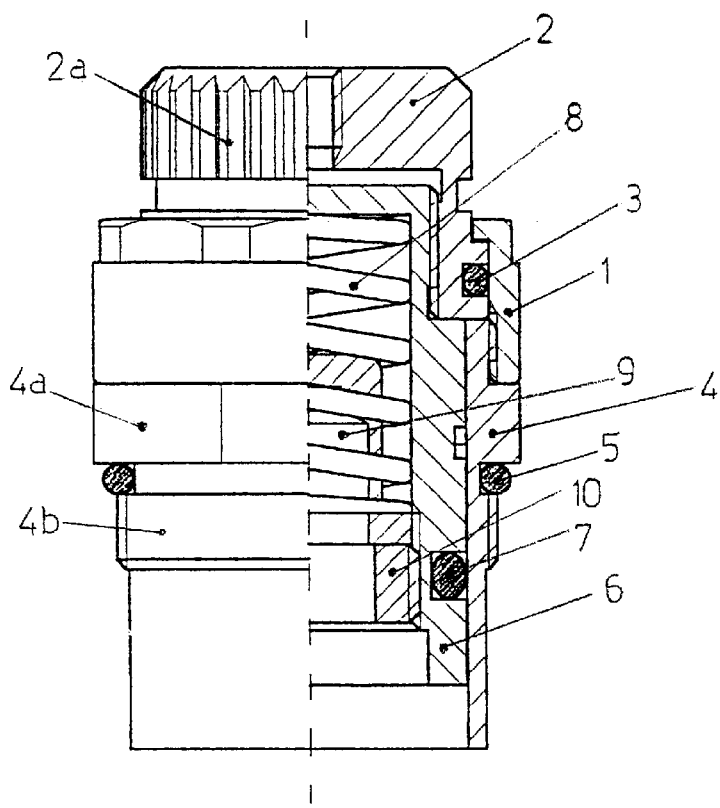
FIG. 4 is a schematic, partially sectional, side view showing a subassembly of the cartridge of FIG. 3.

With reference to FIGS. 2, 3 and 4, the members which make up the thermostatic cartridge CT will now be illustrated in detail. The cartridge is divided into two subassemblies, as it will be better explained further on, the first of which includes the members numbered from 1 to 10 (FIG. 4) and the second one the members from 11 to 24.

The first subassembly includes a ring 1 threaded on the inside so as to rotatably retain a grooved cover 2, together with a relevant circular gasket (O-ring) 3, at the top of a sleeve 4 by means of a first external upper thread on said sleeve 4. Another O-ring 5 in externally inserted on sleeve 4 in a relevant seat. Through sleeve 4 there is inserted an adjusting bar 6, with a relevant O-ring 7, provided at the top with an external thread which engages a corresponding internal thread on cover 2. Bar 6 is hollow but closed at the top, and internally receives in turn a spring 8 and a cap 9 retained from below by an insert 10. Insert 10 is externally threaded so as to engage a corresponding internal thread on bar 6, whereby it is possible to calibrate the thermostatic device by adjusting the compression of spring 8 which pushes cap 9.

As clearly shown in FIG. 4, this group of members makes up a first subassembly called hereinafter "stud". Referring to FIG. 1, there is seen that on said stud there are mounted knob MT, at an external groove 2a on cover 2, and the reference ring GF, at a polygonal coupling 4a. This coupling 4a is formed on the outside of sleeve 4, just above the seat of O-ring 5 and a second external thread 4b which performs the coupling of the stud with the second subassembly of cartridge CT described herebelow.

This second subassembly includes a control member 11, better described further on, and a cylindrical case 12 containing the other members of the thermostatic device and of the valve group. In particular, a thermostatic member 13 is inserted from above through a disk-shaped perforated slider 14, provided with a relevant external O-ring 15, and the whole is inserted together with a lower spring 16 into a body 17. Below the latter there is arranged the valve group, better described further on, which includes an upper gasket 18, a fixed upper disk 19, a mobile central disk 20, a fixed lower disk 21 and a lower gasket 22 (identical with gasket 18). Case 12 is closed at the bottom by a base 23, below which a relevant gasket 24 is arranged for the mounting into the tap body CR.

The presence of three disks 19, 20, 21 is intended to achieve the watertight sealing between mutually moving members made of the same material, whereas the sealing between fixed members may also provide different materials. In practice, disk 20 is mobile with respect to disks 19, 21 and they are all made of a ceramic material; disks 19, 21 are in turn fixedly sealed (by gaskets 18, 22) against body 17 and base 23, respectively, which are made of metal, generally brass. The direct mobile sealing of the ceramic mobile disk 20 against the metallic members 17, 23 would not be so efficient.

It should be noted that the above-described cartridge CT according to the present invention is only made up of 24 pieces, of which four pieces are simple O-rings (3, 5, 7, 15), three pieces are other gaskets (18, 22, 24) and other two pieces are simple spiral springs (8, 16), while the thermostatic member 13 is commercially available. Therefore the pieces which have to be custom-made either in metal or ceramic are 14 only, with a consequent significant advantage in terms of manufacturing cost.

Figure 5:
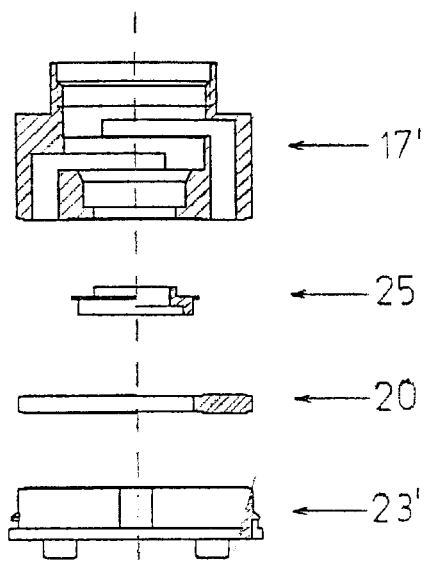
FIG. 5 is an exploded, partially sectional, side view of a variation in some of the members of FIG. 2.

In order to reduce further the number of pieces it is possible to adopt the variation illustrated in FIG. 5, wherein the five members 18–22 of the valve group are reduced to the mobile disk 20 only together with a guide insert 25. In practice, gaskets 18 and 22 are eliminated since the upper and lower fixed disks 19 and 21 are respectively incorporated into a widened body 17' and a raised base 23'. In this way, also the risk of leaks due to wear and/or wrong mounting of gaskets 18, 22 is prevented. However, this solution implies manufacturing a body 17' and a base 23' of a ceramic material same as disk 20, so as to carry out the mobile sealing between members of the same material as explained above.

Figure 6:
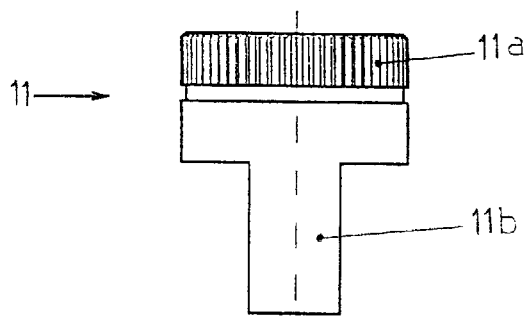
FIG. 6 is a front view of the member for controlling the mobile disk.
Figure 7A:
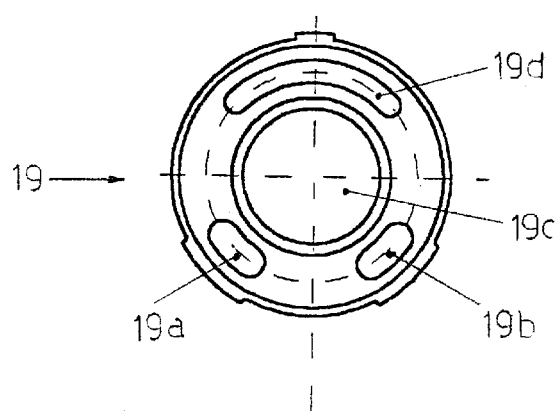
FIGS. 7a, 7b and 7c are top plan views of the disks making up the valve group.
Figure 7B:
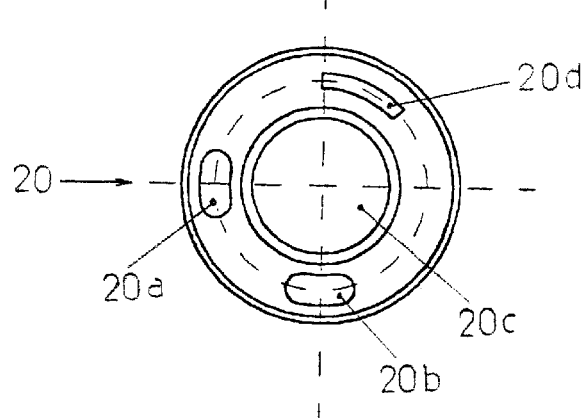
Figure 7C:
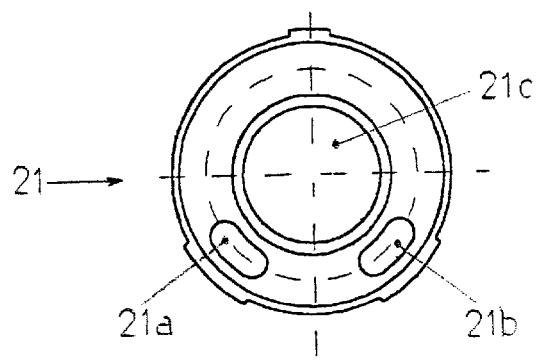

Finally referring to FIGS. 6–7c, the control member 11 and the three disks 19, 20, 21 of the valve group are now illustrated in detail.

The control member 11 consists of a cylindrical collar 11a, whose upper portion is externally grooved, which along a portion of its circumference is extended downwards into a stem 11b. The groove of collar 11a is the groove on which the control lever LP is mounted (FIG. 1), while stem 11b is the element which transmits the rotatory motion directly to the mobile disk 20.

In order to achieve said direct transmission, the upper disk 19 has not only the conventional passage ports 19a, 19b and 19c for the hot, cold and mixed water, respectively, but also an arcuate slot 19d for the passage of stem 11b. Said slot 19d extends along an angle sufficient to allow an angular travel of 45° of the control member 11, between the closed position (shown in FIG. 7b) and the completely open position.

Similarly, the mobile disk 20 in addition to the three water ports 20a, 20b, 20c has also an arcuate slot 20d wherein the tip of stem 11b is inserted so as to control the rotation of the disk. It should be noted that the angular extension of slot 20d is the same as the extension of stern 11b, with a little play so as to make its insertion easier. On the contrary, it is clear that the lower disk 21 is provided only with the three water passage ports 21a, 21b and 21c, same as base 23.

It should be noted that the above-described arrangement for transmitting the flow rate adjustment allows to achieve a flow rate control which is much "lighter" than in conventional taps. In fact, in this case the control only has to overcome the friction between the mobile disk 20 and the adjacent fixed disks 19 and 21, or body 17' and base 23', which are all made of a ceramic material with a low friction coefficient. On the contrary, conventional taps include several members for transmitting the adjustment, which members must rotate within the cartridge case while overcoming the friction caused by the mounting pressure required to assure the sealing between the various members.

As mentioned above, a highly novel aspect of the present cartridge is the division of cartridge CT into two easily separable subassemblies. In fact, in order to access the thermostatic device it is sufficient to remove knob MT and ring GF and to engage the polygonal coupling 4a with a key. By doing so it is easy to unscrew the stud (FIG. 4) from its threaded seat formed at the top of body 17, where it is engaged through thread 4b. In this way the thermostatic member 13, slider 14 and spring 16 may be removed from body 17 to carry out the cleaning. While performing this operation the flow rate control remains operational, since neither lever LP, nor the control member 11, nor ring GB which locks case 12 in the tap body CR with the valve group in the closed position are removed.

This results in the full achievement of the object of allowing an easy maintenance of the thermostatic device without requiring to cut off the water upstream from the tap.

It should also be noted that the control member 11 does not interfere in any way with the thermostatic device. In fact, collar 11a is inserted externally on the upper portion of body 17 which has a peripheral slot extending along an angle equal to the angle of slot 19d. In this way stem 11b can engage slot 20d by passing through slot 19d, and it can rotate the mobile disk 20 under the direct action of lever LP keyed onto collar 11a. This adjustment obviously does not affect the thermostatic member 13 which is housed inside body 17.

The operation of the thermostatic device of the present cartridge is similar to that of conventional thermostatic cartridges and is therefore described in brief herebelow with reference to FIG. 3.

It is based on the thermostatic member 13 which, according to the mixed water temperature detected by the bottom bulb 13a, causes the shifting of slider 14 within the mixing chamber formed in body 17, due to the push of the upper rod 13b against cap 9. The shifting of slider 14 changes the extent of aperture of the inflow ports 17a, 17b of the hot and cold water, respectively, into the mixing chamber from which the mixed water flows down through the ports 19c, 20c, 21c of the valve group. The position of the adjusting bar 6, and therefore the compression of the lower spring 16, is set by rotating cover 2 through knob MT. Also in this instance, the temperature adjustment obviously does not affect the flow rate regulated by member 11 which is outside body 17.

In this way the desired complete separation between the temperature and flow rate controls is achieved.

It is clear that the above-described and illustrated embodiment of the cartridge according to the invention is just an example susceptible of various modifications. For example, the exact shape and number of the members enclosed within case 12 may be changed, in particular disks 19, 20, 21 as well as base 23 and body 17, as previously mentioned. Furthermore, all the members may be replaced by other mechanically equivalent members, such as grooves 2a and 11a which may be other types of rotational couplings.

What is claimed is:

1. A thermostatic and flow control mixing valve for insertion within a conventional tap body (CR), the thermostatic and flow control mixing valve (CT) comprising:

a cartridge mixing valve (CT) for being inserted into the tap body (CR), the cartridge mixing valve (CT) being divided into a first subassembly and a second subassembly, the first subassembly including a thermostatic device having a thermostatic member (13), a slider (14) and a resilient contrast element (16) which are moveable within a mixing chamber for hot and cold water, the mixing chamber being formed in a body (17), the first subassembly controlling a temperature of water passing through the first subassembly, the second subassembly including a valve group having at least one ceramic disk for adjusting a rate of flow of water passing through the second subassembly;

a locking element (GF) securing the cartridge mixing valve (CT) within the tap body (CR);

a first coupling for operatively coupling a flow rate control member (LP) to the second subassembly to control the flow rate of water through the second subassembly;

a second coupling for operatively coupling a temperature control member (MT) to the first subassembly to separately control the temperature of the water flowing through the first subassembly, the first subassembly being removable in an assembled state from the cartridge mixing valve (CT) without removing the second subassembly which is retained in its position by the locking element (GF), the removal of the first subassembly allowing the removal of the thermostatic member, slider and resilient contrast element (13, 14, 16) of the thermostatic device which are moveable within the body (17).

2. The valve according to claim 1, wherein the first and second couplings for the flow rate and temperature control members (LP, MT), respectively, are fixed on an upper portion of the tap body (CR), the second coupling for the temperature control member (MT) being located at the top of the cartridge (CT) above a coupling surface (4a) for a fixed reference member (OF), the fixed reference member having a surface formed externally on the cartridge (CT) above the first coupling for the flow rate control member (LP).

3. The valve according to claim 2, wherein the temperature control member (MT) is a knob rotatable from 0 to 360 around an axis, the knob having a plurality of reference notches along its periphery for setting a temperature, the knob further having a stop button (PF) located at a distal end of the knob for preventing the unintentional setting of an excessive temperature.

4. The valve according to claim 1, wherein the first subassembly further comprises:

a ring (1) having an inside surface, a portion of the inside surface being threaded;

a cover (2) positioned within the inside surface of the ring (1), the cover (2) including a groove having a first O-ring (3) positioned therein, the first O-ring (3) being in engagement with the inside surface of the ring (1);

a sleeve (4) having a first external upper thread engaging the threaded inside surface of the ring (1), the sleeve (4) being in engagement with the cover (2) and having a second O-ring (5) positioned within an external groove on the sleeve (4);

an adjusting bar (6) positioned within the sleeve (4) and including an external thread in engagement with an internal thread inside the cover (2), the adjusting bar (6) being hollow and closed at the top, a spring (8) positioned within the hollow adjusting bar (6), and a cap (9) positioned within the hollow adjusting bar (6), the spring (8) being located between the top of the adjusting bar (6) and the cap (9), the cap (9) being retained within the hollow adjusting bar (6) by an insert (10), the insert (10) being externally threaded to engage a corresponding internal thread on the adjusting bar (6), and the sleeve (4) having a second external thread (4b) to engage a corresponding internal thread on an upper portion of the second subassembly.

5. The valve according to claim 1 wherein the first coupling comprises a cylindrical collar (11a) coupled to the flow rate control member (LP), a portion of the collar extending downwardly to form a stem (11b), the valve group including a mobile disk (20) having a first arcuate slot (20d) which receives the stem (11b) and is thereby operatively coupled to the flow rate member (LP), the collar (11a) being externally positioned on the body (17), the body (17) having a peripheral slot extending along an angle sufficient to allow an angular travel of at least 45 degrees as the stem (11b) rotates within the first arcuate slot (20d).

6. The valve according claim 5 wherein the valve group further comprises an upper fixed disk (19) and a lower fixed disk (21) adjacent to the mobile disk (20), the upper fixed disk (19) having a second arcuate slot (19d) receiving the stem (11b), the second arcuate slot (19d) extending along an angle substantially equal to the angle of the peripheral slot in the body (17).

7. The valve according to claim 5, wherein the mobile disk (20) is directly in contact with a ceramic material base (23') on a first side, as well as directly in contact with both a guide insert (25) and the body (17) on a second side, the guide insert (25) and body (17) being constructed of a ceramic material.

8. A thermostatic and flow control mixing valve for insertion within a conventional tap body (CR), the thermostatic and flow control mixing valve (CT) comprising:

a cartridge mixing valve (CT) for being inserted into the tap body (CR), the cartridge mixing valve (CT) being divided into a first subassembly and a second subassembly, the first subassembly including a thermostatic device having a thermostatic member (13), a slider (14) and a resilient contrast element (16) which are moveable within a mixing chamber for hot and cold water, the mixing chamber being formed in a body (17), the first subassembly controlling a temperature of water passing through the first subassembly, the second subassembly including a valve group having at least one ceramic disk for adjusting a rate of flow of water passing through the second subassembly;

a locking element (GF) securing the cartridge mixing valve (CT) within the tap body (CR);

a flow rate control member (LP) operatively coupled to the second subassembly by a first coupling for controlling the flow rate of water through the second subassembly;

a temperature control member (MT) operatively coupled to the first subassembly by a second coupling for separately controlling the temperature of the water flowing through the first subassembly, the first subassembly being removable in an assembled state from the cartridge mixing valve (CT) without removing the second subassembly which is retained in its position by the locking element (GF), the removal of the first subassembly allowing the removal of the thermostatic member, slider and resilient contrast element (13, 14, 16) of the thermostatic device which are moveable within the body (17).

* * * * *